United States Patent [19]
Walker

[11] Patent Number: 5,870,580
[45] Date of Patent: Feb. 9, 1999

[54] DECOUPLED FORWARDING REORDER BUFFER CONFIGURED TO ALLOCATE STORAGE IN CHUNKS FOR INSTRUCTIONS HAVING UNRESOLVED DEPENDENCIES

[75] Inventor: Wade A. Walker, Austin, Tex.

[73] Assignee: Advanced Micro Devices, Inc.

[21] Appl. No.: 766,510

[22] Filed: Dec. 13, 1996

[51] Int. Cl.⁶ .................................................... G06F 9/38
[52] U.S. Cl. ........................................ 395/394; 395/800.23
[58] Field of Search .................................. 395/392, 393, 395/394, 395, 800.23, 800.41

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,490,280 | 2/1996 | Gupta et al. ............................. 395/393 |
| 5,560,025 | 9/1996 | Gupta et al. ............................. 395/393 |
| 5,584,037 | 12/1996 | Papworth et al. .................. 395/800.23 |
| 5,627,984 | 5/1997 | Gupta et al. ............................. 395/376 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4. Date Unknown.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Richard L. Ellis
*Attorney, Agent, or Firm*—Conley, Rose & Tayon, PC; B. Noel Kivlin; Lawrence J. Merkel

[57] ABSTRACT

A reorder buffer is provided which decouples allocation of storage space within the buffer for storing instructions from forwarding of the corresponding operands. When instructions are presented to the reorder buffer for storage and dependency checking, the reorder buffer allocates storage for the instructions and corresponding instruction results. If an unresolved dependency is detected, the instructions remain stored in the reorder buffer but operand forwarding is delayed until the unresolved dependency becomes resolved. Advantageously, the previously included extra storage and multiplexing prior to dependency checking may be eliminated. Additional clock cycle time may be available for performing dependency checking. Additionally, area formerly occupied by the extra storage is freed for other purposes.

18 Claims, 9 Drawing Sheets

DECOUPLED FORWARDING REORDER BUFFER CONFIGURED TO ALLOCATE STORAGE IN CHUNKS FOR INSTRUCTIONS HAVING UNRESOLVED DEPENDENCIES

BACKGROUND OF THE INVENTION

1. Field of the Invention

This invention relates to the field of microprocessors and, more particularly, to reorder buffers used within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Generally speaking, a given instruction has one or more source operands which are input values to be operated upon by the microprocessor in response to the given instruction. Each source operand is specified by the instruction via a source operand specifier. The source operand specifier identifies a storage location which stores the corresponding source operand. In the x86 microprocessor architecture, for example, a source operand may be stored in a register or a memory location. If a source operand is stored in a register, the source operand specifier identifies one of the registers defined for the instruction set. The identified register stores the source operand. Additionally, the given instruction typically has a destination operand. The destination operand is the result of the instruction. A destination operand is stored into a location specified by a destination operand specifier, similar to the source operand specifier. It is noted that operand specifiers are sometimes referred to as operand addresses.

In order to locate a larger number of instructions which may be concurrently executed, superscalar microprocessors often employ out of order execution. If instructions are executed in order (i.e. "program order", or the order of instructions as listed in the program sequence being executed), then the number of instructions which may be concurrently executed is limited by dependencies between the instructions. A dependency exists between a first instruction and a second instruction if the second instruction receives a value produced via execution of the first instruction (the "result" of the first instruction) as a source operand. Since the second instruction needs the result of the first instruction prior to executing, the first and second instructions cannot be concurrently executed. However, an instruction subsequent to the second instruction which does not depend upon either the first instruction or the second instruction may be concurrently executed with the first instruction.

Microprocessors which implement out of order execution often employ a reorder buffer for storing speculatively generated instruction results until the corresponding instructions become non-speculative. After the corresponding instructions become non-speculative, the instruction results may be moved from the reorder buffer to the storage location indicated by the destination operand specifier. Generally, a particular instruction becomes non-speculative when each of the instructions which may cause an exception and which are prior to the particular instruction in program order have executed and reported no exception. Often, reorder buffers are configured to store the instruction results into the destination storage locations (i.e. retire the instructions) in program order.

Because instruction results are held in the reorder buffer and the instruction results may be source operands for subsequent instructions, reorder buffers perform dependency checking between source operands of the subsequent instructions and the instructions represented within the reorder buffer. Dependency checking is performed in order to forward the source operands (or a reorder buffer tag which identifies an instruction result corresponding to that source operand if the instruction result has not yet been generated via the execution of a prior instruction) to the execution units which receive the subsequent instructions (or to the reservation stations associated with the execution units). If a reorder buffer tag is forwarded, the execution unit monitors instruction results provided to the reorder buffer to capture, as a source operand, the instruction result corresponding to that reorder buffer tag. Generally speaking, dependency checking comprises comparing source operands of instructions to destination operands stored in the reorder buffer. The dependency (or lack thereof) of a particular source operand is said to be resolved if the dependency check performed in a given clock cycle results in a communication of either the source operand, reorder buffer tag information, or a combination of operand values and tags to the execution unit (or reservation station) receiving the instruction having the particular source operand.

In some cases, the dependencies for a particular source operand may not be resolved upon presentation of the corresponding instruction to the reorder buffer. For example, in the x86 microprocessor architecture, the registers comprise multiple fields which may be used as an operand of an instruction. The EAX register contains an AX field comprising the least significant 16 bits of the EAX register; an AH field comprising the most significant 8 bits of the AX field; and an AL field comprising the least significant 8 bits of the AX field. The EAX register, the AX field, the AH field, or the AL field may be used as an operand of the instruction.

Unfortunately, if an instruction uses a particular field of a register as a destination operand and a subsequent instruction uses a field including the particular field and at least one other field, a "narrow to wide" dependency exists. Because the destination of the instruction forms part of the source operand of the subsequent instruction, a single reorder buffer tag or a single operand value is insufficient to describe the dependency. Typically, the receiving execution unit or reservation station is configured to receive one reorder buffer tag or one operand value from the reorder buffer for each source operand. Additional hardware would be needed within the receiving unit to receive a combination of reorder buffer tags and operand values for a particular source operand. Even more hardware would be needed to multiplex together the source operand from the multiple operand values received.

Typically, reorder buffers couple the storing of instructions therein with the forwarding of operands or tags for the instructions. If one or more unresolved dependencies are detected, the instructions being dispatched are stalled until the dependencies can be resolved. Often, the resulting structure is a reorder buffer having an instruction storage for storing instruction results and operand information for instructions which have been dispatched (and for which dependency information has been forwarded) as well as a set of storage locations for storing the reorder buffer inputs corresponding to a set of instructions attempting dispatch. If the set of instructions cannot be dispatched due to an unresolved dependency, the reorder buffer inputs are stored in the set of storage locations. In a subsequent clock cycle, the reorder buffer reattempts dependency checking and forwarding of the set of instructions. When all dependencies can be resolved, instruction information corresponding to the instructions is stored into the instruction storage and the dependency information is forwarded.

Unfortunately, the extra set of storage locations used to store stalled instructions occupies additional semiconductor die area which might advantageously be allocated to other functionality. Still further, the reorder buffer inputs must be multiplexed with those stored in the extra set of storage locations before dependency checking can be initiated. The amount of time within the clock cycle available to dependency checking is thereby decreased.

SUMMARY OF THE INVENTION

The problems outlined above are in large part solved by a reorder buffer in accordance with the present invention. The reorder buffer decouples allocation of storage space within the buffer for storing instructions from forwarding of the corresponding operands. When instructions are presented to the reorder buffer for storage and dependency checking, the reorder buffer allocates storage for the instructions and corresponding instruction results. If an unresolved dependency is detected, the instructions remain stored in the reorder buffer but operand forwarding is delayed until the unresolved dependency becomes resolved. Advantageously, the previously included extra storage and multiplexing prior to dependency checking may be eliminated. Additional clock cycle time may be available for performing dependency checking. Additionally, area formerly occupied by the extra storage is freed for other purposes.

Broadly speaking, the present invention contemplates a method for dispatching instructions in a superscalar microprocessor. A first plurality of source operand specifiers corresponding to a first plurality of concurrently decoded instructions is received in a reorder buffer during a first clock cycle. Dependencies between the first plurality of source operand specifiers and a second plurality of destination operand specifiers stored in an instruction storage within the reorder buffer are resolved. A first plurality of destination operand specifiers corresponding to the first plurality of concurrently decoded instructions are stored into the instruction storage in the first clock cycle, even if the resolving of dependencies is delayed to a second clock subsequent to the first clock cycle.

The present invention further contemplates a reorder buffer coupled to receive a plurality of source operand specifiers and a first plurality of destination operand specifiers corresponding to a first plurality of concurrently decoded instructions. The reorder buffer comprises an instruction storage and a dependency checking unit. The instruction storage is configured to store a second plurality of destination operand specifiers corresponding to a second plurality of instructions. The second plurality of instructions is prior to the first plurality of concurrently decoded instructions in program order. Coupled to the instruction storage, the dependency checking unit is configured to perform dependency checking between the plurality of source operand specifiers and the second plurality of destination operand specifiers. If at least one unresolved dependency is detected, the dependency checking unit is configured to delay forwarding of a plurality of values corresponding to the plurality of source operand specifiers. Forwarding is delayed between a first clock cycle in which the plurality of source operand specifiers is received and a second clock cycle in which the unresolved dependency is resolved. The instruction storage is configured to store the first plurality of destination operand specifiers during the first clock cycle regardless of an existence or an absence of the unresolved dependency.

The present invention still further contemplates a microprocessor comprising a reorder buffer, a first reservation station, and a second reservation station. The reorder buffer is coupled to receive a first plurality of source operand specifiers and a first destination operand specifier corresponding to a first instruction and to receive a second plurality of source operand specifiers and a second destination operand specifier corresponding to a second instruction concurrently decoded with the first instruction. The reorder buffer is configured to store the first destination operand specifier and the second destination operand specifier into an instruction storage included within the reorder buffer. Additionally, the instruction storage is configured to concurrently store a plurality of destination operand specifiers corresponding to a plurality of instructions which are prior to the first instruction in program order. The first destination operand specifier and the second destination operand specifier are stored into the instruction storage upon receipt by the reorder buffer. The reorder buffer is configured to delay forwarding of a plurality of values corresponding to the first plurality of source operand specifiers and the second plurality of source operand specifiers if at least one unresolved dependency is detected with respect to the first plurality of source operand specifiers and the second plurality of source operand specifiers. The first reservation station is coupled to receive the first instruction and coupled to the reorder buffer whereby the first reservation station receives a portion of the plurality of values corresponding to the first plurality of source operand specifiers. Similarly, the second reservation station is coupled to receive the second instruction and coupled to the reorder buffer whereby the second reservation station receives a second portion of the plurality of values corresponding to the second plurality of source operand specifiers.

BRIEF DESCRIPTION OF THE DRAWINGS

Other objects and advantages of the invention will become apparent upon reading the following detailed description and upon reference to the accompanying drawings in which.

Figure 1:
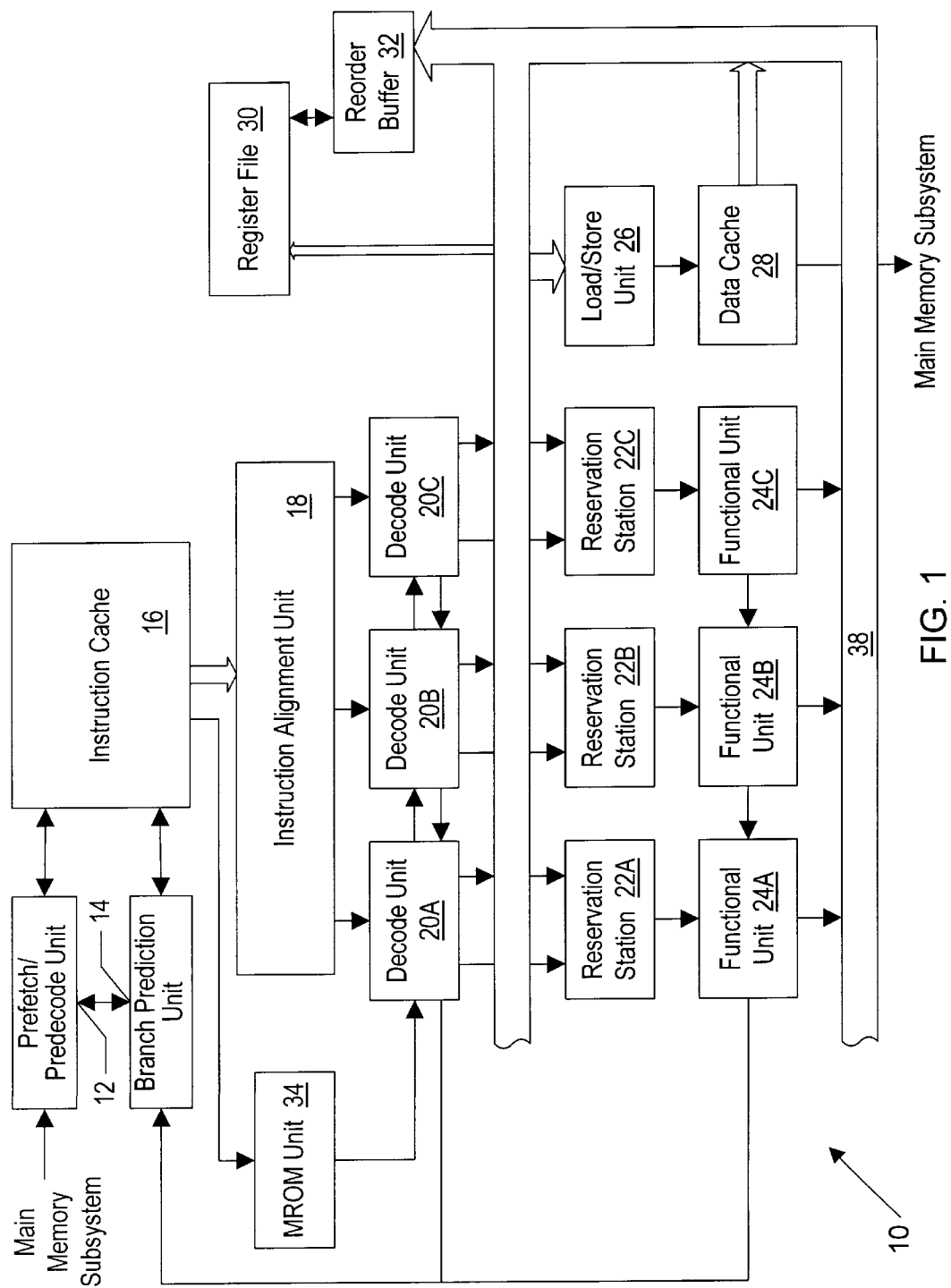
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, reorder buffer 32 is configured to receive multiple concurrently decoded instructions from decode units 20 during a clock cycle. Reorder buffer 32 includes an instruction storage and allocates space therein for the operand information corresponding to the concurrently decoded instructions. The instruction storage is configured to concurrently store operand information corresponding to other instructions which are prior to the concurrently decoded instructions in program order. Reorder buffer 32 performs dependency checking between the concurrently decoded instructions and the prior instructions. If a dependency is detected which is unresolvable, reorder buffer 32 withholds forwarding of the operands for the concurrently decoded instructions. Additionally, reorder buffer 32 stalls subsequent instructions until the dependencies for the concurrently decoded instructions are resolved. Upon resolution of the unresolved dependencies, the operand values and/or reorder buffer tags corresponding to the source operands are forwarded to the reservations stations 22 receiving each instruction. Advantageously, the concurrently decoded instructions are stored into the instruction storage regardless of whether or not an unresolved dependency is detected. In other words, the storage of instruction information into reorder buffer 32 is decoupled from the forwarding of operand information. The previously included set of storage locations for storing the input information to the reorder buffer upon detection of an unresolved dependency are eliminated in favor of storing the information directly into the instruction storage.

The term "concurrently decoded instructions" as used herein refers to one or more instructions which are provided to decode units 20 during the same clock cycle. The instructions may originate from instruction alignment unit 18 or MROM unit 34. According to one particular embodiment employing the line-oriented reorder buffer described below, the concurrently decoded instructions are stored into one of the lines of the line-oriented reorder buffer.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
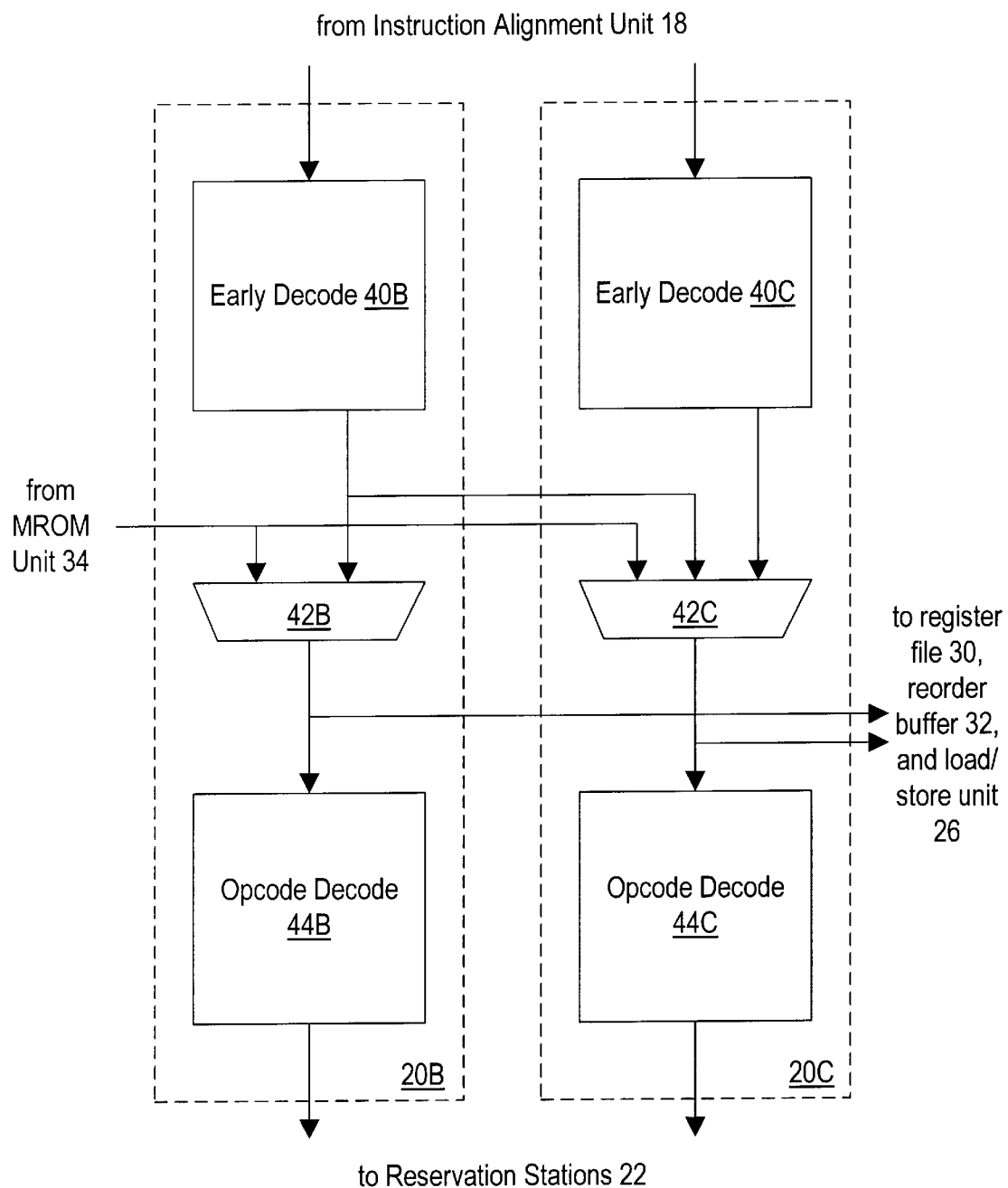
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
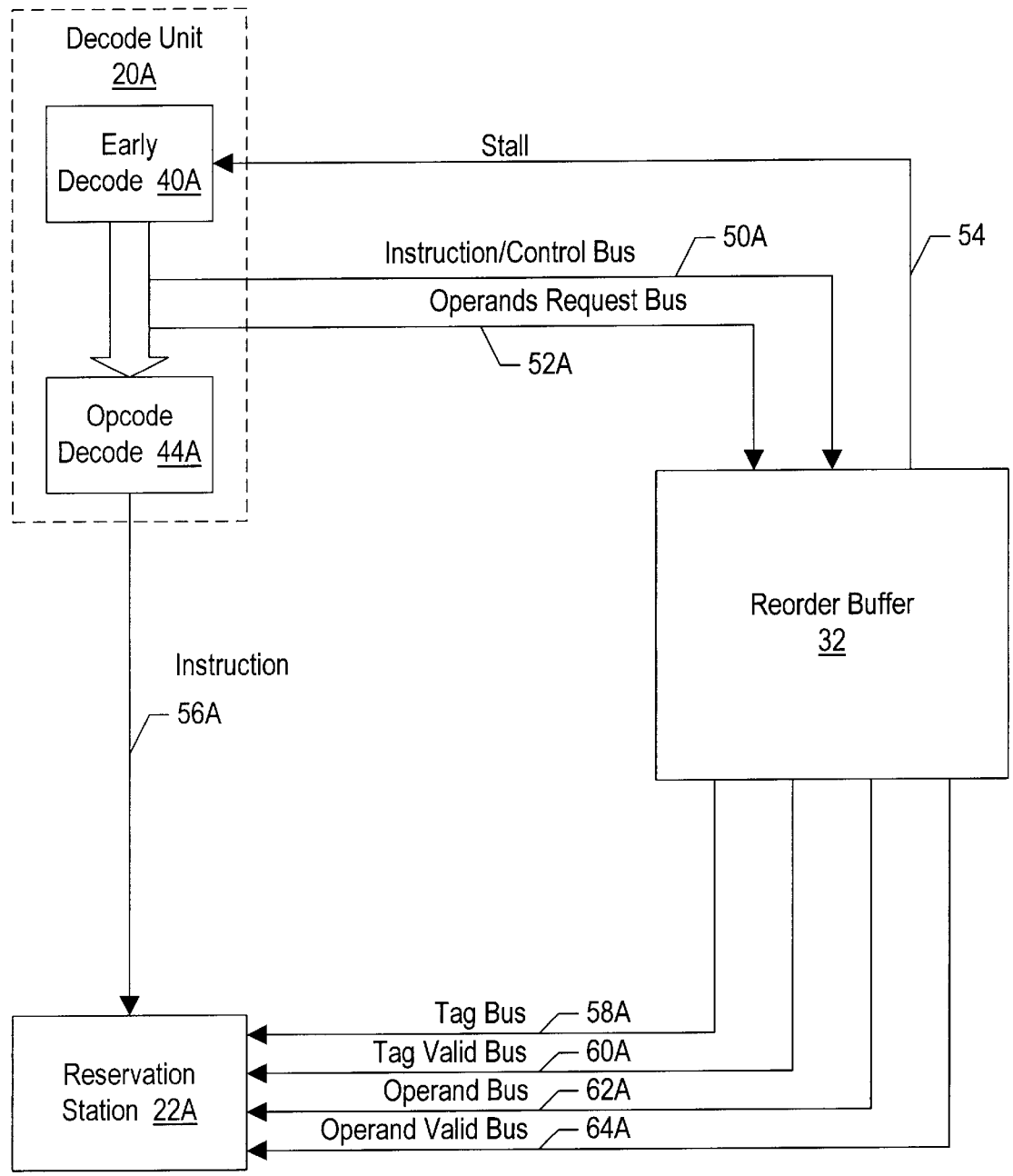
FIG. 3 is a block diagram of one embodiment of a decode unit, a reorder buffer, and a reservation station shown in FIG. 1, highlighting interconnections therebetween.

Turning now to FIG. 3, a block diagram including decode unit 20A, reorder buffer 32, and reservation station 22A is shown to highlight interconnect therebetween according to one embodiment of microprocessor 10. Additional interconnect other than that shown in FIG. 3 may be included. Interconnect between decode units 20B–20C, reorder buffer 32, and reservation stations 22B–22C may be similar to that shown in FIG. 3. As shown in FIG. 3, decode unit 20A includes an early decode unit 40A and an opcode decode unit 44A.

Early decode unit 40A provides an instruction/control bus 50A and an operands request bus 52A to reorder buffer 32. Additionally, early decode unit 40A receives a stall signal from reorder buffer 32 upon a stall line 54. Stall line 54 is further coupled to early decode units 40B and 40C (shown in FIG. 2). Opcode decode unit 44A provides a decoded instruction to reservation station 22A upon an instruction bus 56A. Additionally, reservation station 22A receives a tag bus 58A, a tag valid bus 60A, an operand bus 62A, and a operand valid bus 64A from reorder buffer 32.

Early decode unit 40A, upon decode of an instruction provided by instruction alignment unit 18, transmits information regarding the register operands used by the instruction upon operands request bus 52A. A memory operands bus (not shown) is used to transmit requests for memory operands to load/store unit 26. Generally speaking, early decode unit 40A is configured to concurrently transmit register source operand specifiers for each possible source operand of an instruction as well as a register destination operand specifier upon operands request bus 52A. In one embodiment, microprocessor 10 employs the x86 microprocessor architecture. Instructions defined by the x86 microprocessor architecture may specify one source operand and one source/destination operand (i.e. the source/destination operand specifier specifies a storage location which both stores a source operand for the instruction and is to store the destination operand for the instruction). Additionally, operands request bus 52A indicates the validity of each register operand specifier. A particular register operand specifier may be invalid if the corresponding operand is not used by the instruction or if the corresponding operand is a memory operand requested from load/store unit 26.

Reorder buffer 32, in addition to receiving requests for register operands, also receives additional instruction identification signals from early decode unit 40A upon instruction/control bus 50A. The information conveyed upon instruction/control bus 50A is information which reorder buffer 32 uses to handle exception recovery and retirement of instructions. For example, branch instructions are identified. Additionally, instructions which request a memory operand are identified. Both of these types of instructions can experience exceptions, and so the control information can be used to indicate which instructions in the reorder buffer may create exceptions. Additionally, the address of the instruction is conveyed such that, if the instruction does experience an exception, the instruction can be identified by an exception handling routine (in the case of an exception visible to software) or exception handling hardware (in the case of an exception recovered by hardware). Many other control signals may be employed depending upon various implementational choices. Generally, reorder buffer 32 operates upon the signals provided upon instruction/control bus 50A and similar buses from other early decode units 40 to form control information for storage in the instruction storage within reorder buffer 32. The control information is typically encoded (i.e. the control information comprises fewer bits than the number of signals provided by instruction/control bus 50A and similar buses from other decode units 20). For example, the address of each instruction may not be stored in the instruction storage. Instead, the address of the instruction from decode unit 20A may be stored. Offsets measured from the address may be stored for the instructions from each of the other decode units. In one embodiment, up to one branch instruction may be stored in each line of storage within reorder buffer 32. Therefore, up to two addresses may be stored for a set of concurrently decoded instructions (one address for instructions prior to and including the branch instruction, and the second address for instructions subsequent to the branch instruction, within the instructions in the line). For each instruction, reorder buffer 32 stores an offset and an indication of the address to which the offset corresponds.

Opcode decode unit 44A receives the instruction from early decode unit 40A and decodes the opcode of the instruction into a set of control signals for reservation station 22A. The decoded instruction is provided to reservation station 22A, which stores the instruction into a storage location allocated therein. The storage location includes space for storing the reorder buffer tags and operand values provided by reorder buffer 32. Additionally, operand values may be captured from result bus 38 (shown in FIG. 1).

Reservation station 22A receives operands upon operand bus 62A and receives reorder buffer tags upon tag bus 58A. Operand bus 62A is configured to convey up to the maximum number of register source operands which may be specified by an instruction according to the microprocessor architecture employed by microprocessor 10. For example, embodiments of microprocessor 10 employing the x86 microprocessor architecture are configured to convey up to two register operands upon operand bus 62A. Operand valid bus 64A includes a valid signal corresponding to each operand which may be conveyed upon operand bus 62A. If a operand is conveyed by reorder buffer 32 upon operand bus 62A, then the corresponding valid signal upon operand valid bus 64A is asserted. Otherwise, the corresponding valid signal is deasserted. It is noted that the term "register operand" refers to an operand stored in a register.

Similarly, reorder buffer tags corresponding to source operands and to the destination operand for an instruction are conveyed upon tag bus 58A. For embodiments of microprocessor 10 employing the x86 microprocessor architecture, up to two reorder buffer tags identifying source operands may be conveyed upon tag bus 58A as well as one reorder buffer tag identifying the destination operand of the instruction. For each reorder buffer tag which may be conveyed upon tag bus 58A, a corresponding valid signal upon tag valid bus 60A is asserted. If a reorder buffer tag is not conveyed for a given operand, the corresponding valid signal is deasserted. It is noted that a reorder buffer tag is a value which identifies a storage location within the instruction storage employed by reorder buffer 32. The identified storage location is allocated to an instruction upon which a source operand depends (for reorder buffer tags forwarded in response to a source operand specifier) or the location allocated to the instruction (for the destination reorder buffer tag).

If reorder buffer 32 detects an unresolved dependency for at least one of the source operands requested via operands request bus 52A or similar operand request buses from other decode units 20, reorder buffer 32 inhibits assertion of the valid signals upon tag valid bus 60A and operand valid bus 64A (as well as valid signals upon similar buses to reservation stations 22B and 22C). Reservation station 22A stores the instruction provided upon instruction bus 56A but indicates that the operands for the instruction are invalid. When the unresolved dependency is resolved, reorder buffer 32 asserts the appropriate valid signals to provide the operand information for the instruction to reservation station 22A. In this manner, operands are provided in a delayed fashion with respect to the clock cycle at which the corresponding instructions are stored into reorder buffer 32.

In addition to delaying the forwarding of operands, reorder buffer 32 asserts a stall signal upon stall line 54 to early decode unit 40A (as well as to early decode units 40B–40C, shown in FIG. 2) upon detection of an unresolved dependency. Early decode units 40, upon receipt of the asserted stall signal, stall subsequent instructions from presentation to reorder buffer 32 and opcode decode units 44. In this manner, subsequent instructions are withheld until the unresolved dependency is resolved. Reorder buffer 32 deasserts the stall signal upon resolution of the unresolved dependency, thereby allowing the subsequent instructions to be presented to reorder buffer 32 and opcode decode u nits 44 ( i.e. progress down the instruction processing pipeline).

Figure 4:
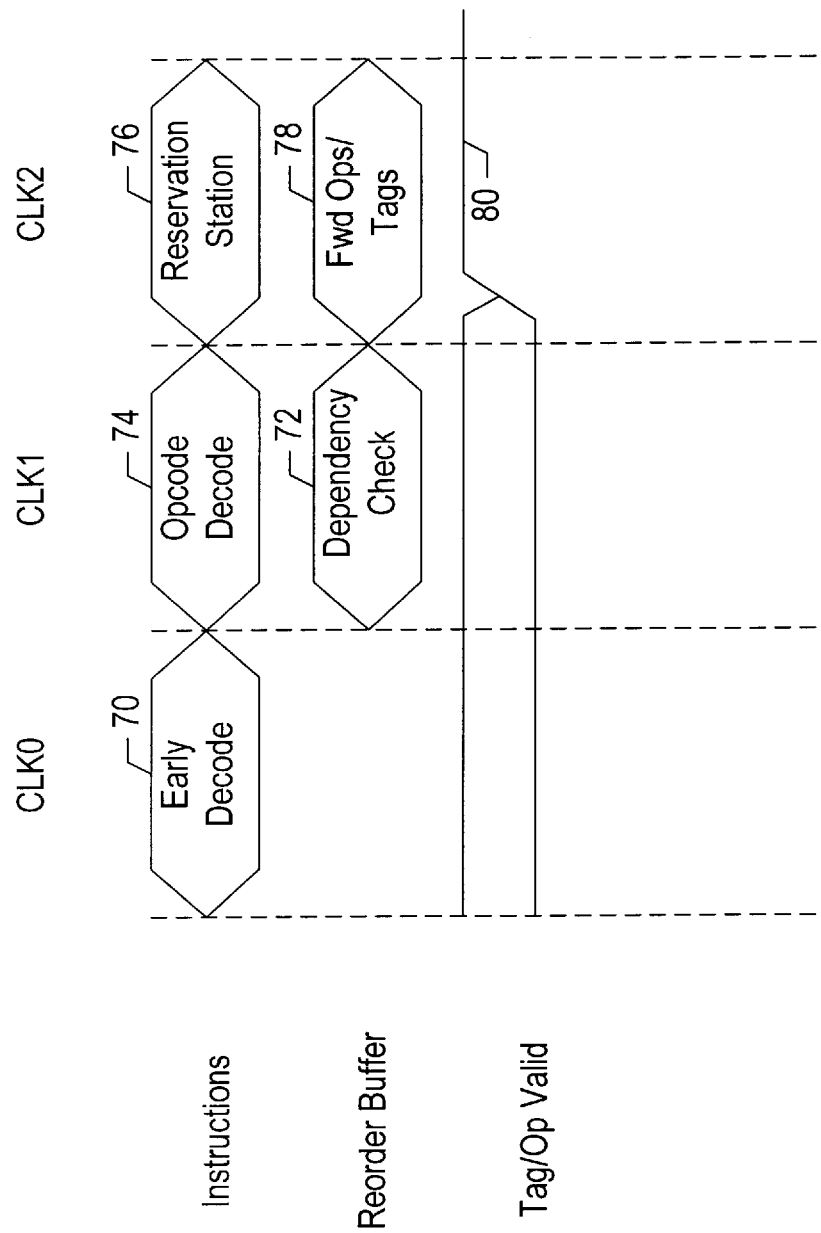
FIG. 4 is a timing diagram illustrating immediate forwarding of operands from the reorder buffer to the reservation station.

Turning next to FIG. 4, a timing diagram illustrating operand forwarding from reorder buffer 32 to reservation stations 22 is shown. The timing diagram of FIG. 4 illustrates operand forwarding when all dependencies for the source operands of the instructions are resolved upon presentation of the instructions to reorder buffer 32. FIG. 4 illustrates several consecutive clock cycles (labeled CLK0, CLK1, and CLK2). Each clock cycle is delimited with vertical dashed lines.

During clock cycle CLK0, a set of concurrently decoded instructions are processed by early decode units 40 (reference number 70). Source and destination operand specifiers are identified by early decode units 40 for transmittal to reorder buffer 32 and load/store unit 26. As noted above, register operand specifiers are conveyed to reorder buffer 32 for dependency checking and forwarding of the register operands or reorder buffer tags. Memory operands are conveyed to load/store unit 26 as load/store operations. It is noted that, according to one embodiment of microprocessor 10, functional units 24 perform address generation for memory operands. Fast path instructions using memory operands are limited to the use of one register in the address calculation, thereby limiting the total number of register operand used by a given fast path instruction to two. Other addressing modes are implemented using MROM unit 34.

During clock cycle CLK1, the operand specifiers corresponding to the set of concurrently decoded instructions are received by reorder buffer 32, which performs dependency checking upon the source operands (reference number 72). Dependency checking involves not only comparing the source operand specifiers to destination operand specifiers stored within reorder buffer 32, but also includes comparisons to the destination operand specifiers of other instructions within the set of concurrently decoded instructions which are prior to a particular instruction in program order. The instruction upon which a particular source operand depends is the instruction having a destination operand specifier which matches the particular source operand specifier and is the instruction which is last, in program order, among the instructions within reorder buffer 32 to use that destination operand specifier. Reorder buffer 32, in response to the dependency check performed during clock cycle CLK1, selects operands or reorder buffer tags for forwarding in response to each source operand specifier presented.

In addition to performing dependency checking during clock cycle CLK1, reorder buffer 32 allocates storage for the set of concurrently decoded instructions within the instruction storage included therein. Source and destination operand specifiers are stored into the allocated storage, and a reorder buffer tag is assigned to each destination operand specifier. In addition, the instruction information provided upon instruction/control bus 50A (and similar buses from early decode units 44B–44C) is processed by reorder buffer 32 and appropriate encoded instruction information stored into the allocated portion of the instruction storage. Still further, the allocated portion of the instruction storage includes space for each instruction result to be generated upon execution of each of the set of concurrently decoded instructions.

Additionally during clock cycle CLK1, the set of concurrently decoded instructions undergoes continued decode in opcode decode units 44 (reference number 74). The set of concurrently decoded instructions is converted into the format used by reservation stations 22 and functional units 24, and is readied for transmittal to reservation stations 22 and functional units 24.

During clock cycle CLK2, the set of concurrently decoded instructions is stored in reservation stations 22 (reference number 76). Concurrently, reorder buffer tags and/or operands are forwarded from reorder buffer 32 (reference number 78). Accompanying the tags and operands is an assertion of the corresponding valid signals upon tag valid bus 60A (and similar buses to reservation stations 22B–22C) and operand valid bus 64A (and similar buses to reservation stations 22B–22C). A signal 80 shown in FIG. 4 represents the assertion of corresponding valid signals during clock cycle CLK2. During clock cycles CLK0 and CLK1, the valid signals may be asserted or deasserted in response to instructions prior to the set of concurrently decoded instructions in program order.

Figure 5:
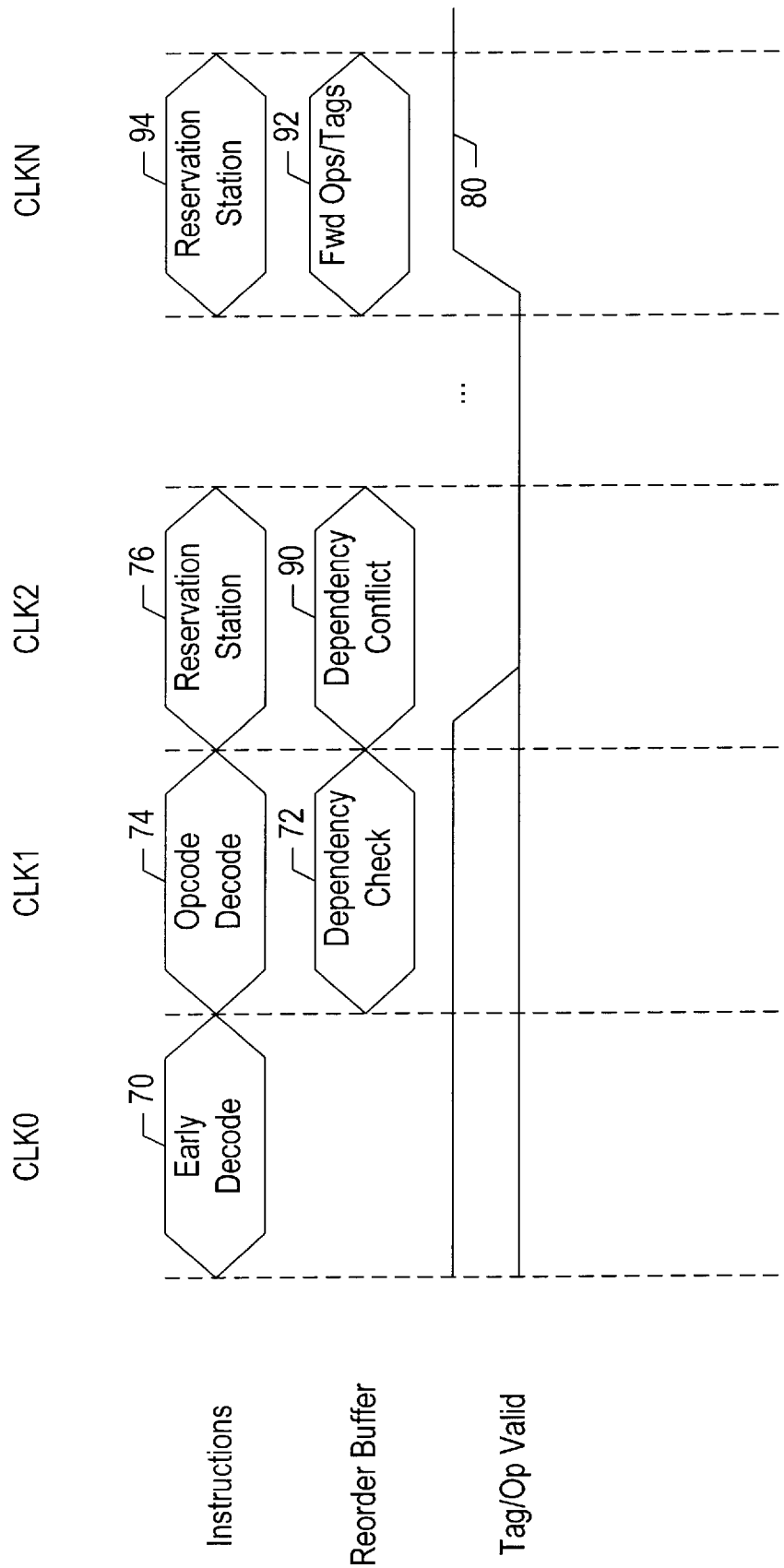
FIG. 5 is a timing diagram illustrating delayed forwarding of operands from the reorder buffer to the reservation station.

Turning next to FIG. 5, a second timing diagram illustrating operand forwarding from reorder buffer 32 to reservation stations 22 is shown. The timing diagram of FIG. 5 illustrates operand forwarding when at least one unresolved dependency for the source operands of the instructions are detected upon presentation of the instructions to reorder buffer 32. FIG. 5 illustrates several consecutive clock cycles (labeled CLK0, CLK1, and CLK2), as well as a clock cycle CLKN which may be consecutive to clock cycle CLK2 or may be separated from clock cycle CLK2 by one or more clock cycles. Each clock cycle is delimited with vertical dashed lines.

During clock cycle CLK0, a set of concurrently decoded instructions are processed by early decode units 40 (reference number 70). Source and destination operand specifiers are identified by early decode units 40 for transmittal to reorder buffer 32 and load/store unit 26. As noted above, register operand specifiers are conveyed to reorder buffer 32 and memory operand specifiers are conveyed to load/store unit 26 as load/store operations.

During clock cycle CLK1, the operand specifiers corresponding to the set of concurrently decoded instructions are received by reorder buffer 32, which performs dependency checking upon the source operands (reference number 72). Reorder buffer 32, during the dependency check performed during clock cycle CLK1, detects an unresolved dependency for one or more source operands. Reorder buffer 32 stores the operands and/or tags corresponding to the resolved dependencies, as well as the location of the unresolved dependency within the instruction storage of the reorder buffer. Reorder buffer 32 monitors results produced by functional units 24 in order to update the resolved dependencies as well as to resolve the unresolved dependencies. Resolved dependencies may require update if a reorder buffer tag is selected as the resolution of a dependency and one of the functional units 24 executes the instruction corresponding to that reorder buffer tag. In that case, the resolved dependency is updated to include the value produced via execution of the corresponding instruction.

According to one embodiment, unresolved dependencies comprise detection of a narrow-to-wide dependency for a source operand of one of the set of concurrently decoded instructions. Resolving the dependency, according to this embodiment, comprises waiting for the instruction upon which the dependency is detected to retire. The corresponding operand value is then read from register file 30 by reorder buffer 32.

In addition to performing dependency checking during clock cycle CLK1, reorder buffer 32 allocates storage for the set of concurrently decoded instructions within the instruction storage included therein. Source and destination operand specifiers are stored into the allocated storage, and a reorder buffer tag is assigned to each destination operand specifier. In addition, the instruction information provided upon instruction/control bus 50A (and similar buses from early decode units 44B–44C) is processed by reorder buffer 32 and appropriate encoded instruction information stored into the allocated portion of the instruction storage. Reorder buffer 32 allocates the storage for the set of concurrently decoded instructions and stores the information therein despite the detection of unresolved dependencies.

Additionally during clock cycle CLK1, the set of concurrently decoded instructions undergoes continued decode in opcode decode units 44 (reference number 74). The set of concurrently decoded instructions is converted into the format used by reservation stations 22 and functional units 24, and is readied for transmittal to reservation stations 22 and functional units 24.

During clock cycle CLK2, the set of concurrently decoded instructions is stored in reservation stations 22 (reference number 76). However, reorder buffer tags and/or operands are not forwarded from reorder buffer 32 due to the detected unresolved dependency (or dependency conflict, reference number 90). Accordingly, the valid signals upon tag valid bus 60A (and similar buses to reservation stations 22B–22C) and operand valid bus 64A (and similar buses to reservation stations 22B–22C) are deasserted during clock cycle CLK2 (as represented by a logical low value upon signal 80 in clock cycle CLK2 of FIG. 5).

Upon resolution of the unresolved dependencies with respect to the set of concurrently decoded instructions, the operands and/or reorder buffer tags which comprise the resolved dependencies are forwarded to reservation stations 22. In FIG. 5 the forwarding occurs in clock cycle CLKN, as represented by reference number 92 and the assertion of signal 80. As illustrated by the ellipses between clock cycle CLK2 and clock cycle CLKN, one or more clock cycles may elapse between clock cycle CLK2 and clock cycle CLKN. On the other hand, clock cycle CLKN may be consecutive to clock cycle CLK2 in the case that the unresolved dependency is resolved via execution of the corresponding instruction during clock cycle CLK2.

As illustrated in FIG. 5 (reference number 94), the set of concurrently decoded instructions remains in reservation stations 22 until at least clock cycle CLKN. Since operands have not been forwarded by reorder buffer 32, the corresponding instructions are not executed by functional units 24. Reservation stations 22 store the concurrently decoded instructions from clock cycle CLK2 to CLKN, and the instructions indicate that both the source operands and the reorder buffer tags corresponding to the source operands are invalid. Upon forwarding of the operands and reorder buffer tags during clock cycle CLKN, reservation stations 22 validate the operands and reorder buffer tags which are forwarded. Subsequent instruction execution occurs when each of the source operands has been provided.

Figure 6:
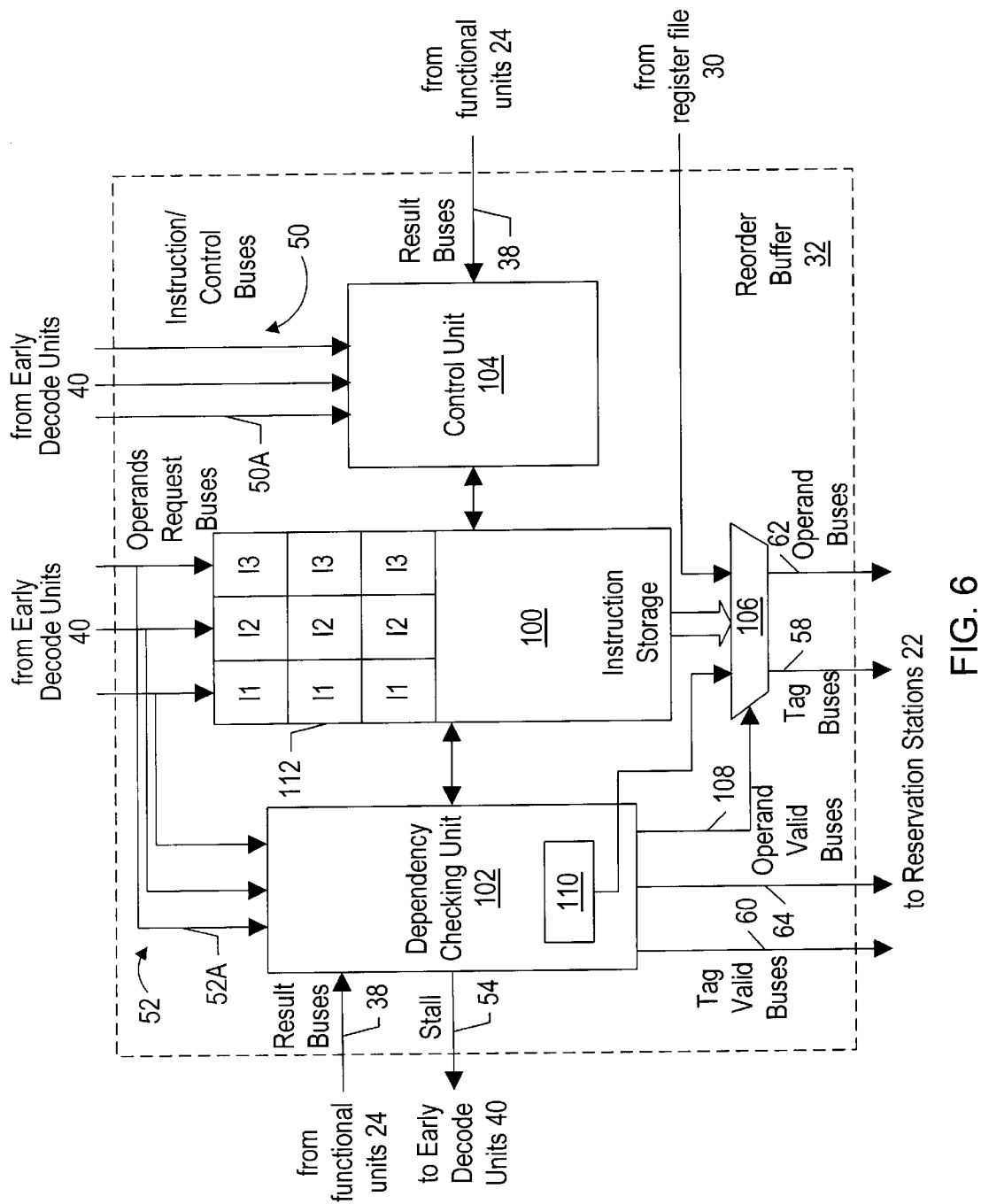
FIG. 6 is a block diagram of a portion of one embodiment of the reorder buffer shown in FIG. 3.

Turning to FIG. 6, a block diagram of one embodiment of reorder buffer 32 is shown. As shown in FIG. 6, reorder buffer 32 includes an instruction storage 100, a dependency checking unit 102, a control unit 104, and a selection block 106. Operands request buses 52, including operands request bus 52A from early decode unit 40A, are coupled to dependency checking unit 102 and instruction storage 100. Instruction/control buses 50, including instruction/control bus 50A from early decode unit 40A, are coupled to control unit 104. Stall line 54 is coupled to dependency checking unit 102. Additionally, tag valid buses 60 (including tag valid bus 60A to reservation station 22A) and operand valid buses 64 (including operand valid bus 64A to reservation station 22A) are coupled to dependency checking unit 102. Dependency checking unit 102 is coupled to provide selection controls 108 to selection block 106. Result buses 38 are coupled to dependency checking unit 102 and control unit 104. Register file 30 provides values stored in the architected registers requested via operands request buses 52 to selection block 106, which conveys values upon tag buses 58 (including tag bus 58A to reservation station 22A) and operand buses 62 (including operands bus 62A to reservation station 22A). Additionally, instruction storage 100 is coupled to selection block 106. Dependency checking unit 102 and control unit 104 are both coupled to instruction storage 100.

In the absence of unresolved dependencies, dependency checking unit 102 performs dependency checking upon source operand specifiers provided upon operands request buses 52 (i.e. the source operand specifiers corresponding to a set of concurrently decoded instructions). In response to the dependency check, dependency checking unit 102 generates the signals upon tag valid buses 60 and operand valid buses 64. Dependency checking unit 102 locates the last instruction, in program order, to update a register specified by a particular source operand specifier. If the instruction has not yet been executed (i.e. instruction storage 100 is not yet storing the result of the instruction), then dependency checking unit 102 selects the reorder buffer tag of the instruction for forwarding upon tag buses 58 via selection block 106 and asserts the corresponding tag valid signal upon tag valid buses 60. Alternatively, if the instruction has executed, then dependency checking unit 102 selects the instruction result from instruction storage 100 for conveyance upon operand buses 62 (via selection block 106) and asserts the corresponding operand valid signal upon operand valid buses 64. Similarly, if no instruction within instruction storage 100 updates the register indicated by the source operand, the value provided from register file 30 is provided upon operand buses 62 and the corresponding operand valid signal is asserted upon operand valid buses 64. Dependency checking between destination operand specifiers provided upon operands request buses 52 and the source operand specifiers is performed in a similar manner as dependency checking between the source operand specifiers and the destination operand specifiers stored in instruction storage 100.

If dependency checking unit 102 detects an unresolved dependency, then dependency checking unit 102 deasserts the valid signals upon both tag valid buses 60 and operand valid buses 64. In addition, dependency checking unit 102 asserts the stall signal upon stall line 54. Dependency checking unit 102 then monitors the unresolved dependencies until each unresolved dependency with respect to the set of concurrently decoded instructions is resolved. Once the unresolved dependencies are resolved, dependency checking unit 102 deasserts the stall signal and asserts the appropriate valid signals upon tag valid buses and operand valid buses 64. According to one embodiment, unresolved dependencies comprise narrow-to-wide dependencies. The narrow-to-wide dependency is resolved when the instruction which updates the "narrow" register is retired and dependency checking unit 102 reads the "wide" register from register file 30.

Since instructions prior to the set of concurrently decoded instructions in program order continue to execute while the unresolved dependency is resolved, the dependencies which are resolved may change prior to forwarding of the operands/reorder buffer tags to reservation stations 22. More particularly, if a particular dependency indicates that a reorder buffer tag is to be forwarded for a particular source operand and the instruction identified by the reorder buffer tag executes prior to resolution of the unresolved dependency, then the instruction result corresponding to the instruction should be forwarded instead of the reorder buffer tag. According to one embodiment, dependency checking unit 102 captures an initial set of reorder buffer tags and operand values corresponding to the source operands for the set of concurrently decoded instructions upon detection of the unresolved dependency. The initial set of reorder buffer tags and operand values is based upon the results of the dependency check performed upon receipt of the set of concurrently decoded instructions. Dependency checking unit 102 monitors result buses 38 during the clock cycles in which the unresolved dependency continues to be unresolved. If a reorder buffer tag included in the initial set is transmitted upon result buses 38, the corresponding instruction result is captured and the initial set is updated with the instruction result. Upon resolution of the unresolved dependency, the instruction result is forwarded instead of the reorder buffer tag.

A storage location 110 within dependency checking unit 102 is used to store the initial set of reorder buffer tags and operand values and to receive the updates. Storage location 110 is coupled to selection block 106, and dependency checking unit 102 is configured to select the contents of storage location 110 for conveyance upon tag buses 58 and operand buses 62 upon resolution of unresolved dependencies with respect to the set of concurrently decoded instructions.

It is noted that, in addition to resolution of the unresolved dependencies with respect to the set of concurrently decoded instructions, the occurrence of an exception causes dependency checking unit 102 to deassert the stall signal upon stall line 54. The exception is experienced by an instruction prior to the set of concurrently decoded instructions, and therefore the set of concurrently decoded instructions is to be discarded. Subsequently, microprocessor 10 provides instructions from the correct instruction stream.

Control unit 104 receives the instruction identification signals upon instruction/control buses 50. Control unit 104 encodes the information presented for storage in instruction storage 100. Furthermore, control unit 104 allocates storage for each instruction in instruction storage 100. The storage is allocated regardless of whether or not dependency checking unit 102 detects an unresolved dependency. The storage allocated for each instruction includes space for storing the instruction result (i.e. the destination operand), the source and destination specifiers, the reorder buffer tag corresponding to the destination operand, and the encoded instruction information generated by control unit 104 for the instruction. According to one embodiment, instruction storage 100 is configured as a line-oriented buffer as described above. A line 112 is configured to store instruction information for a maximum number of concurrently decodable instructions in microprocessor 10. According to the embodiment of microprocessor 10 shown in FIG. 1, the maximum number of concurrently decodable instructions is three. Other embodiments may define the maximum number of concurrently decodable instructions differently. The line 112 is allocated upon presentation of at least one instruction to reorder buffer 32, regardless of the number of instructions actually presented. For a line-oriented embodiment, the line tag corresponding to the line may be stored by instruction storage 100 as opposed to different reorder buffer tags for each instruction in the line. The offset tag is inherent in the position of the instruction within the line.

Control unit 104 is further configured to route instruction results to the corresponding storage locations within instruction storage 100 upon receipt of the results from result buses 38. Furthermore, instruction retirement is handled by control unit 104.

It is noted that reorder buffer 32 may be configured to employ a set of last in buffer bits to aid in dependency checking. The last in buffer bits are set for each instruction which is the last, in program order, to update the register which is the destination of that instruction. Dependency checking unit 102 may use the last in buffer bits to directly determine which of the instructions represented within reorder buffer 32 is the instruction upon which a source operand depends. In other words, only one matching comparison of source operand specifiers to destination operand specifiers is detected: the destination operand for which the last in buffer bit is set. The destination operands of the instructions presented to reorder buffer 32 are compared as well, in order to reset the last in buffer bits for instructions having the same destination operand specifier as the instructions being presented.

It is noted that, in the present description, instructions may be referred to as being "stored" within reorder buffer 32. Instruction bytes themselves may not actually be stored in reorder buffer 32. Instead, information used be reorder buffer 32 in the retirement and exception recovery of instructions may be stored for each instruction, as well as source and destination operand information. When instructions are referred to as being stored within reorder buffer 32, the instructions are allocated a storage location for storing the aforementioned information.

Figure 7:
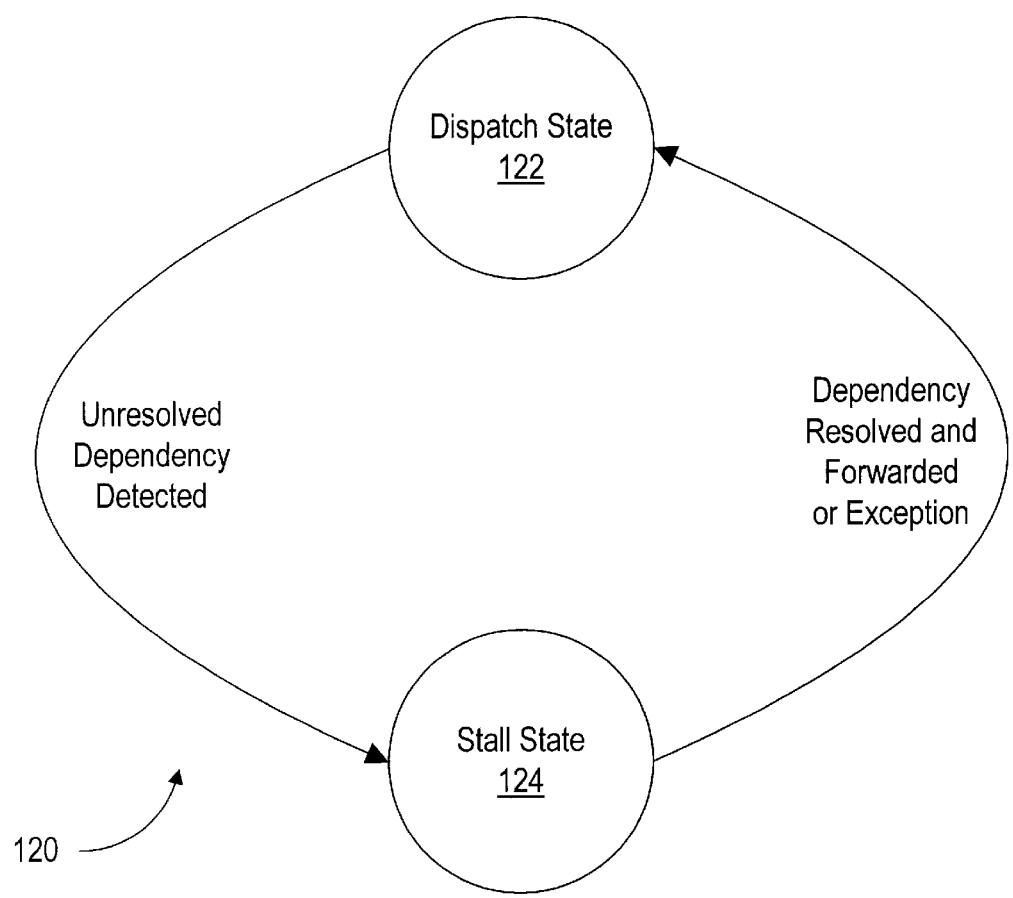
FIG. 7 is a state machine diagram corresponding to one embodiment of a dependency checking unit shown in FIG. 6.

Turning next to FIG. 7, an exemplary state machine 120 which is employed by one embodiment of dependency checking unit 102 is shown. Dependency checking unit 102 initially operates in a dispatch state 122. While in dispatch state 122, dependency checking unit 102 receives source operand specifiers for sets of concurrently decoded instructions, performs dependency checking, and forwards operand information as a result of the dependency check without additional delay. Upon detection of an unresolved dependency, state machine 120 transitions to a stall state 124. Additionally, if state machine 120 is in dispatch state 122 and a transition to stall state 124 is initiated, dependency checking unit 102 asserts the stall signal and deasserts all tag valid and operand valid signals upon tag valid buses 60 and operand valid buses 64. Furthermore, upon initiation of the transition to stall state 124, the operand values and reorder buffer tags which result from the resolved dependencies are captured by dependency checking unit 102 in storage location 110.

While state machine 120 is in stall state 124, dependency checking unit 102 monitors instruction storage 100 for resolution of the unresolved dependency. Additionally, dependency checking unit 102 monitors result bus 38 for execution of the instructions corresponding to reorder buffer tags captured upon detection of the unresolved dependency. Still further, dependency checking unit 102 is configured to assert the stall signal and to deassert all tag valid and operand valid signals until the unresolved dependency is resolved. Upon resolution of the unresolved dependency, state machine 120 is configured to transition to dispatch state 122. Additionally, the stall signal is deasserted and the appropriate tag valid and operand valid signals are asserted upon initiation of a transition to dispatch state 122. Still further, dependency checking unit 102 selects the contents of storage location 110 through selection device 106 upon initiation of a transition from stall state 124 to dispatch state 122. State machine 120 is further configured to transition from stall state 124 to dispatch state 122 upon detection of an exception.

It is noted that the above discussion refers to an unresolved dependency and the resolution of the unresolved dependency. However, multiple unresolved dependencies may be detected for a given set of concurrently decoded instructions. Each of the unresolved dependencies must be resolved prior to forwarding operands and allowing subsequent instructions to be presented to reorder buffer 32.

Figure 8:
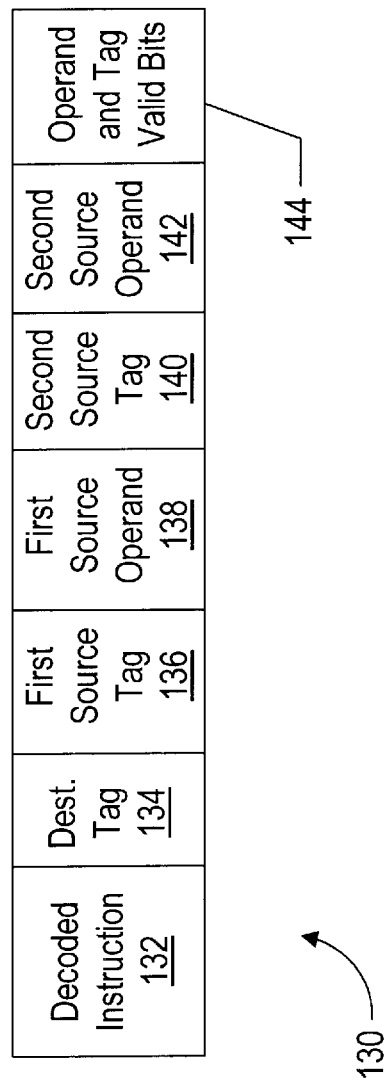
FIG. 8 is a diagram illustrating a reservation station entry corresponding to one embodiment of the reservation station shown in FIG. 3.

Turning next to FIG. 8, a diagram depicting an exemplary storage location 130 which may be included in reservation stations 22 for storing an instruction and related information is shown. Storage location 130 includes a variety of fields which store the instruction information. A decoded instruction field 132 is provided for storing the decoded instruction received from the corresponding decode unit 20A–20C. A destination tag field 134 stores the reorder buffer tag assigned to the instruction. The reorder buffer tag is conveyed upon result bus 38 upon execution of the instruction. The reorder buffer tag corresponding to the first source operand for the instruction is stored in first source tag field 136, and the first source operand itself is stored in a first source operand field 138. As noted above, the reorder buffer tag corresponding to the first source operand (i.e. the reorder buffer tag identifying the instruction which produces the first source operand as a result) is forwarded to reservation station 22 if the source operand is not yet available. Subsequently, the source operand is provided and is stored in first source operand field 138. Similarly, the second operand of the instruction is represented by values in second source tag field 140 and second source operand field 142.

Operand and tag valid bits 144 are provided for indicating which of first source tag field 136, first source operand field 138, second source tag field 140, and second source operand field 142 are storing valid values. The operand and tag valid bits 144 are set according to corresponding operand and tag valid signals provided upon tag valid buses 60 and operand valid buses 64. If operand forwarding is delayed due to an unresolved dependency, then reservation stations 22 await an assertion of at least one valid signal upon tag valid buses 60 and operand valid buses 64 in order to set an initial state of operand and tag valid bits 144. Subsequently, the operand valid bits within operand and tag valid bits 144 are set when the operand values are captured from result bus 36. Once all of the operand valid bits are set for the source operands used by the instruction, the instruction may be selected for execution by reservation stations 22.

Figure 9:
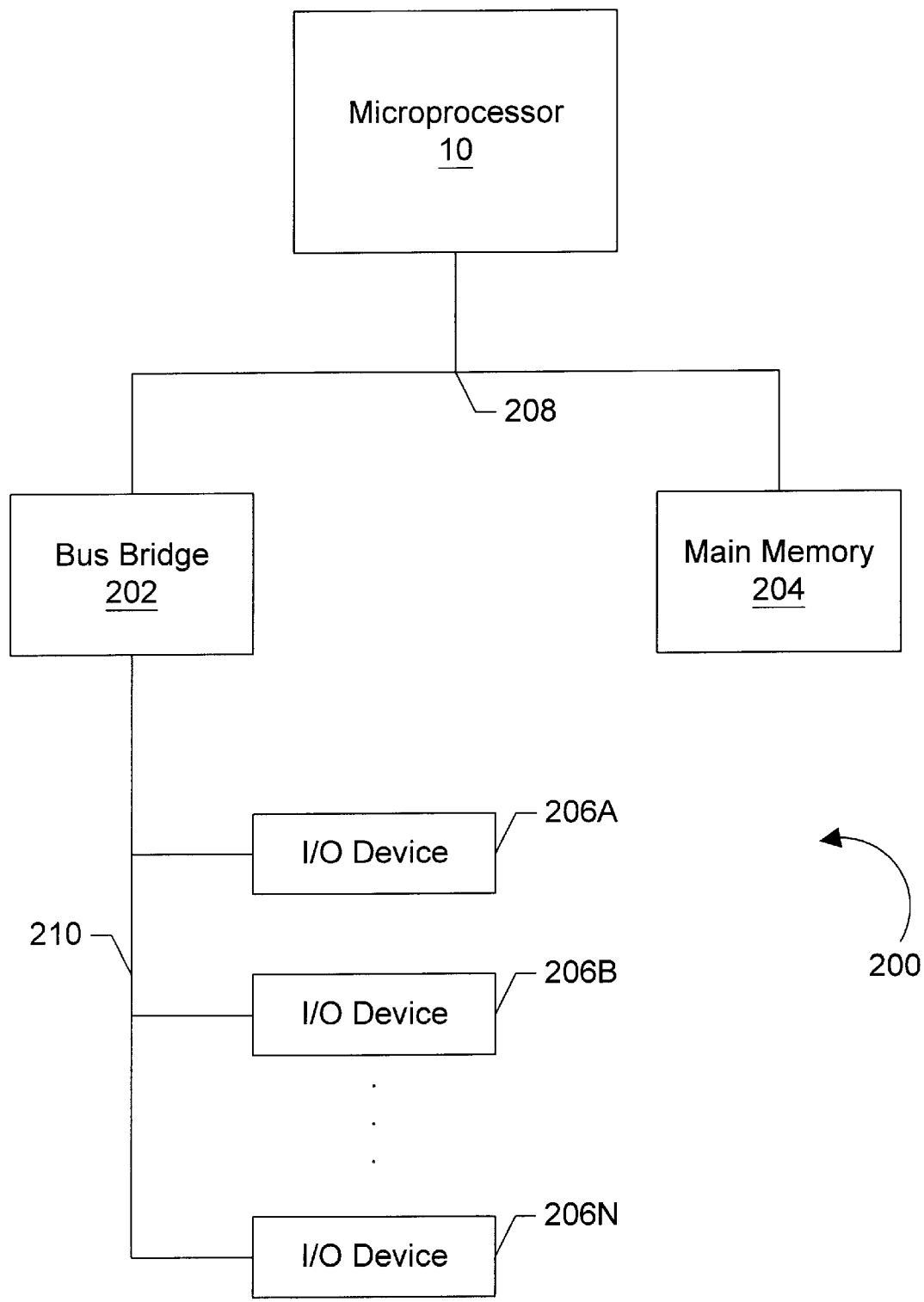
FIG. 9 is a block diagram of one embodiment of a computer system including the microprocessor shown in FIG. 1.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

Table 1: x86 Fast Path, Double Dispatch, and MROM Instructions

TABLE 1

| x86 Fast Path, Double Dispatch, and MROM Instructions | |
|---|---|
| X86 Instruction | Instruction Category |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |

TABLE 1-continued

| x86 Fast Path, Double Dispatch, and MROM Instructions | |
|---|---|
| X86 Instruction | Instruction Category |
| LFS | MROM |
| LGS | MRCM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MRCM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |

TABLE 1-continued x86 Fast Path, Double Dispatch, and MROM Instructions

| X86 Instruction | Instruction Category |
|---|---|
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MRCM |
| XADD | MROM |
| XCHG | MROM |
| XLAT | fast path |
| XLATB | fast path |
| XOR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

In accordance with the above disclosure, a decoupled forwarding reorder buffer has been described. The reorder buffer is configured to receive a set of concurrently decoded instructions. Storage within the reorder buffer is allocated regardless of whether the operands can be forwarded concurrently. If an unresolved dependency for one or more operands is detected, forwarding of operands is stalled until the dependencies are resolved. Advantageously, the extra storage and multiplexing prior to performing dependency checking may be eliminated. Additional clock cycle time may thereby become available for performing dependency checking.

Numerous variations and modifications will become apparent to those skilled in the art once the above disclosure is fully appreciated. It is intended that the following claims be interpreted to embrace all such variations and modifications.

What is claimed is:

1. A method for dispatching instructions in a superscalar microprocessor, comprising:

receiving a first plurality of source operand specifiers corresponding to a first plurality of concurrently decoded instructions, said receiving occurring in a reorder buffer during a first clock cycle;

resolving dependencies between said first plurality of source operand specifiers and a second plurality of destination operand specifiers stored in an instruction storage within said reorder buffer; and storing a first plurality of destination operand specifiers corresponding to said first plurality of concurrently decoded instructions into said instruction storage in said first clock cycle, even if said resolving dependencies is delayed to a second clock subsequent to said first clock cycle, and wherein said storing said first plurality of destination operand specifiers comprises allocating a line of storage within said instruction storage, wherein said line of storage is configured to store operand information corresponding to a maximum number of concurrently decodable instructions, and wherein said allocating a line of storage is performed even if said maximum number is greater than a number of said first plurality of concurrently decoded instructions.

2. The method as recited in claim 1 wherein a particular dependency for a particular source operand is resolved upon selecting a value corresponding to said particular source operand for communication to a reservation station which receives a particular instruction specifying said particular source operand.

3. The method as recited in claim 2 wherein said value comprises a reorder buffer tag if said particular source operand is a destination operand indicated by one of said second plurality of destination operand specifiers and an instruction corresponding to said destination operand is executed subsequent to said resolving.

4. The method as recited in claim 2 wherein said value comprises said particular source operand if said particular source operand is stored in said instruction storage prior to said resolving.

5. The method as recited in claim 1 wherein said resolving is delayed if a narrow to wide dependency is detected.

6. The method as recited in claim 1 further comprising stalling a second plurality of concurrently decoded instructions until said resolving is completed.

7. A recorder buffer coupled to receive a plurality of source operand specifiers and a first plurality of destination operand specifiers corresponding to a first plurality of concurrently decoded instructions, comprising:

an instruction storage configured to store a second plurality of destination operand specifiers corresponding to a second plurality of instructions wherein said second plurality of instructions is prior to said first plurality of concurrently decoded instructions in program order; and a dependency checking unit coupled to said instruction storage, wherein said dependency checking unit is configured to perform dependency checking between said plurality of source operand specifiers and said second plurality of destination operand specifiers, and wherein said dependency checking unit is configured to delay forwarding of a plurality of values corresponding to said plurality of source operand specifiers if at least one unresolved dependency is detected, and wherein forwarding is delayed between a first clock cycle in which said plurality of source operand specifiers is received and a second clock cycle in which said unresolved dependency is resolved;

wherein said instruction storage is configured to store said first plurality of destination operand specifiers during said first clock cycle regardless of an existence or an absence of said unresolved dependency;

and wherein said instruction storage is configured to allocate a line storage for storing said first plurality of destination operand specifiers, wherein a line of storage is configured to store a number of destination operand specifiers equal to a maximum number of concurrently decoded instructions, and wherein said instruction storage is configured to allocate said line of storage even if said maximum number is greater than a number of said first plurality of destination specifiers.

8. The recorder buffer as recited in claim 7 wherein said dependency checking unit comprises a state machine having a first state and a second state, and wherein said state machine operates in said first state unless said unresolved dependency is detected, and wherein said state machine transitions to said second state upon detection of said unresolved dependency.

9. The recorder buffer as recited in claim 8 wherein said dependency checking unit, while said state machine is in said first state, is configured to forward said plurality of values unless said unresolved dependency is detected.

10. The recorder buffer as recited in claim 8 wherein said dependency checking unit, while said state machine is in said second state, is configured to delay forwarding of said plurality of values until said unresolved dependency is resolved.

11. The recorder buffer as recited in claim 10 wherein said state machine transitions to said first state upon resolution of said unresolved dependency.

12. The reorder buffer as recited in claim 10 wherein said dependency checking unit is configured to stall a second plurality of concurrently decoded instructions subsequent to said first plurality of concurrently decoded instructions in program order upon detection of said unresolved dependency while state machine is in said first state.

13. The recorder buffer as recited in claim 12 wherein said dependency checking unit is further configured to stall said second plurality of concurrently decoded instructions while said state machine is in said second state.

14. A microprocessor comprising:

a recorder buffer coupled to receive a first plurality of source operand specifiers and a first destination operand specifiers corresponding to a first instruction and to receive a second plurality of source operand specifiers and a second destination operand specifiers corresponding to a second instruction concurrently decoded with said first instruction, wherein said reorder buffer is configured to store said first destination operand specifier and said second destination operand specifier into an instruction storage included within said reorder buffer, wherein said reorder buffer is configured to allocate a line of storage for storing said first destination operand specifier and said second destination operand specifier, wherein said line of storage is configured to store a number of destination operand specifier equal to a maximum number of concurrently decoded instructions, and wherein said maximum number is greater than two, and wherein said instruction storage is configured to concurrently store a plurality of destination operand specifiers corresponding to a plurality of instructions which are prior to said first instruction in program order, and wherein said first destination operand specifier and said second destination operand specifier are stored into said instruction storage upon receipt by said recorder buffer, and wherein said recorder buffer is configured to delay forwarding of a plurality of values corresponding to said first plurality of source operand specifiers and said second plurality of source operand specifiers if at least one unresolved dependency is detected with respect to said first plurality of source operand specifiers and said second plurality of source operand specifiers;

a first reservation station coupled to receive said first instruction and coupled to said reorder buffer whereby said first reservation station receives a portion of said plurality of values, wherein said portion of said plurality of values corresponds to said first plurality of source operand specifiers; and a second reservation station coupled to receive said second instruction and coupled to said reorder buffer whereby said second reservation station receives a second portion of said plurality of values, wherein said second portion of said plurality of values corresponds to said second plurality of source operand specifiers.

15. The microprocessor as recited in claim 14 further comprising a tag valid bus coupled between said reorder buffer and said first reservation station, wherein said tag valid bus comprises a plurality of signal lines, and wherein each of said plurality of signal lines corresponds to a different one of said first plurality of source operand specifiers, and wherein a signal asserted upon one of said plurality of signal lines indicates validity of a reorder buffer tag corresponding to one of said first plurality of source operand specifiers corresponding to said one of said plurality of signal lines, and wherein said reorder buffer tag is conveyed by said reorder buffer to said first reservation station within said portion of said plurality of values.

16. The microprocessor as recited in claim 15 further comprising an operand valid bus coupled between said reorder buffer and said first reservation station, wherein said operand valid bus comprises a second plurality of signal lines, and wherein each of said second plurality of signal lines corresponds to a different one of said first plurality of source operand specifiers, and wherein a second signal asserted upon one of said second plurality of signal lines indicates validity of a source operand corresponding to one of said first plurality of source operand specifiers corresponding to said one of said second plurality of signal lines, and wherein said source operand is conveyed by said reorder buffer to said first reservation station within said portion of said plurality of values.

17. The microprocessor as recited in claim 16 wherein said reorder buffer is configured to deassert signals upon said tag valid bus and said operand valid bus if said unresolved dependency is detected.

18. The microprocessor as recited in claim 17 wherein said reorder buffer is configured to assert said signals upon said tag valid bus and said operand valid bus responsive to said portion of said plurality of values conveyed to said first reservation station upon resolution of said unresolved dependency.

* * * * *

UNITED STATES PATENT AND TRADEMARK OFFICE
CERTIFICATE OF CORRECTION

PATENT NO. : 5,870,580
DATED : February 9, 1999
INVENTOR(S) : Wade A. Walker

It is certified that error appears in the above-identified patent and that said Letters Patent is hereby corrected as shown below:

Claim 7, col. 26, line 56, please change "recorder" to "reorder".

Claim 7, col. 27, line 17, please add "of" after "line".

Claim 8, col. 27, line 25, please change "recorder" to "reorder".

Claim 9, col. 27, line 36, please change "recorder" to "reorder".

Claim 10, col. 27, line 36, please change "recorder" to "reorder".

Claim 11, col. 27, line 40, please change "recorder" to "reorder".

Claim 13, col. 27, line 49, please change "recorder" to "reorder".

Claim 14, col. 27, line 54, please change "recorder" to "reorder".

Claim 14, col. 27, line 56, please change "specifiers" to "specifier".

UNITED STATES PATENT AND TRADEMARK OFFICE
CERTIFICATE OF CORRECTION

PATENT NO. : 5,870,580
DATED : February 9, 1999
INVENTOR(S) : Wade A. Walker

It is certified that error appears in the above-identified patent and that said Letters Patent is hereby corrected as shown below:

Claim 14, col. 27, line 58, please change "specifiers" to "specifier".

Claim 14, col 28, line 1, please chang "specifier" to "specifiers".

Claim 14, col. 28, line 11, please change "recorder" to "reorder".

Claim 14, col. 28, line 12, please change "recorder" to "reorder".

Signed and Sealed this

Twenty-ninth Day of June, 1999

*Attest:*

Q. TODD DICKINSON

*Attesting Officer*  Acting Commissioner of Patents and Trademarks